United States Patent
Williamson et al.

[15] 3,635,734
[45] Jan. 18, 1972

[54] MANUFACTURE OF BLUE-VEINED CHEESE

[72] Inventors: Wayne T. Williamson, Des Plaines; Myro Purko, Evanston, both of Ill.

[73] Assignee: Kraftco Corporation, New York, N.Y.

[22] Filed: Aug. 19, 1968

[21] Appl. No.: 753,712

[52] U.S. Cl. .............................................. 99/116, 99/59 X
[51] Int. Cl. .............................................. A23c 19/02
[58] Field of Search .............................................. 99/116, 59

[56] References Cited

UNITED STATES PATENTS

| | | | |
|---|---|---|---|
| 3,159,490 | 12/1964 | Hussong et al. | 99/116 |
| 3,365,303 | 1/1968 | Hedrick et al. | 99/116 |
| 3,420,742 | 1/1969 | Farr | 99/116 X |
| 3,483,087 | 12/1969 | Christensen | 99/116 X |

OTHER PUBLICATIONS

Kosikowski F., Cheese and Fermented Milk Foods, Publ. by the Author. 1966 Distributed by Edwards Brothers, Inc. Ann Arbor, Michigan. (pages 25–26) SF271.K6

*Primary Examiner*—Lionel M. Shapiro
*Assistant Examiner*—D. M. Naff
*Attorney*—Anderson, Luedeka, Fitch, Even and Tabin

[57] ABSTRACT

A method for producing blue-veined cheese wherein a suitable culture of a gas producing micro-organism is selected and is grown in a suitable media. The culture is then concentrated and added to the milk from which the blue-veined cheese is to be manufactured. The gas-producing micro-organism is selected to provide a desired level of gas during curing of the cheese.

3 Claims, No Drawings

MANUFACTURE OF BLUE-VEINED CHEESE

The present invention relates generally to an improved method for making blue-veined cheese and more particularly relates to a method for making blue-veined cheese with improved mold distribution.

There are at least 50 different varieties of blue-veined cheese known to the cheese industry. However, only four varieties of blue-veined cheese comprise the major proportion of commercially prepared blue-veined cheese. These are Roquefort, Stilton, Gorgonzola and Blue cheese. Each of these different varieties of blue-veined cheese vary somewhat in the details of manufacture. Roquefort and Blue cheese are made in substantially the same way, except that Blue cheese is made from cow's milk, whereas Roquefort is made from sheep's milk. Stilton and Gorgonzola are made from cow's milk but differ from Roquefort and Blue cheese in methods of preparing and handling the curd and in details of curing. In each of the varieties of blue-veined cheese the form desired in the final product is similar, i.e., a substantially complete tracery of blue veins which permeates the curd of the cheese.

Certain aspects of the present invention will be hereinafter particularly discussed with reference to Blue cheese. It should be understood, however, that the method of the present invention is suitable for the manufacture of other varieties of blue-veined cheese.

Blue cheese is generally made in the United States from cow's milk, but may sometimes also be made from goat's milk. The following general procedure is used when Blue cheese is made from cow's milk:

Fresh, clean cow's milk which may be pasteurized and may be homogenized is added to a vat. A lactic starter is added to the milk and the milk is set with rennet at a temperature of 88° F. to provide a coagulum. The coagulum is then cut to provide curd and whey and the whey is drained off. The curd is placed in perforated metal hoops which are about 7½ inches in diameter and 6 inches deep to form individual cheeses. Blue-green *Penicillum roqueforti* mold powder may be added to the milk along with the lactic starter or may be mixed with the curd, either while the curd is still in the vat, i.e., after the whey has been drained, or while the curd is being put into the hoops. Some salt may also be mixed with the curd. The curd is held in the hoops for about 24 hours, during which time the hoops are turned frequently.

Salting of the cheese is usually started either when the cheese is removed from the hoops, or several days later by placing the cheese in brine. The cheese is pierced with 40 or more ⅛-inch diameter holes to permit air to reach the interior of the cheese. Such piercing of the cheese is essential to promote mold growth and create the blue-veined effect. The cheese is then placed in a mold development room which is maintained at a temperature of about 50° F. and a relative humidity of about 95 percent for a period of about 22 days. The cheese is then placed on edge on racks in a carrier. The cheese is cured for about 3 months at a temperature of about 45° F. The surface of the cheese is scraped or cleaned at regular intervals, usually every 3 or 4 weeks, to remove slime and foreign molds from the surface. The finished Blue cheese contains not more than 46 percent moisture and the cheese solids contain not less than 50 percent milk fat.

While the above-described method for making Blue cheese may be used to provide Blue cheese of acceptable quality, there is a possibility that the procedure will not result in a cheese having the desired network of blue veins therein. Also, the texture of the cheese is sometimes too close or firmly knit. It would be desirable to provide a method for making Blue cheese wherein there is less possibility of having an inadequate development of blue veins. It would also be desirable to provide Blue cheese having a more open texture and better mold development.

Accordingly, it is an object of the present invention to provide an improved method for making blue-veined cheese. It is another object of the present invention to provide an improved method for making blue-veined cheese wherein the cheese has a well-developed network of veins. It is a further object of the present invention to provide an approved method for making Blue cheese wherein the finished cheese has a well-developed network of blue veins therein.

These and other objects of the present invention will become more clear from a careful reading of the following detailed disclosure.

In general, in a process embodying various of the features of the present invention, a gas-producing micro-organism is introduced into milk which is to be made into a blue-veined cheese prior to setting of the milk. The gas-producing micro-organism is selected so as to produce a desired level of gas in the cheese during the curing process. Such gas development during the curing of the cheese aids in developing a blue-veined network in the cheese during curing and provides a more open texture in the finished cheese. The invention also provides for treating the micro-organism to provide the micro-organism in a form suitable for storage and convenient use in the manufacture of blue-veined cheese.

More particularly, any gas-producing micro-organism may be used in the practice of the invention which is capable of providing at least about 800 microliters of carbon dioxide for each 10 milliliters of culture per 4 hour period at a temperature of 86° F. It is also preferred that the micro-organism has a limited acid-producing capability of at least less than about two-thirds that of the usual acid-producing micro-organisms used in the production of blue-veined cheese, such as *Streptococcus lactis*. A particularly preferred micro-organism is *Streptococcus diacetilactis*.

The gas-producing ability of each viable culture of a gas-producing micro-organism is subject to variation. It is therefore considered desirable to grow each particular viable culture of the micro-organism in a suitable growth media and to thereafter check its gas-producing ability prior to further treatment of the micro-organism. When *S. diacetilactis* is used as the gas-producing micro-organism, a viable culture of the *S. diacetilactis* is used to inoculate a citrate broth growth media. In this connection 1 milliliter of a viable culture of *S. diacetilactis* is used to inoculate 100 mililiters of the citrate broth. Citrate broth growth media is well known in the microbiology art. A typical citrate broth is as follows:

| Ingredients | Grams/Liter |
| --- | --- |
| Tryptone | 10.0 |
| Glucose | 10.0 |
| Sodium citrate | 20.0 |
| Yeast extract | 5.0 |
| Magnesium sulfate | 1.0 |
| Dibasic potassium phosphate | 1.0 |
| Hydrocloric acid | Sufficient to establish a pH of 7.0 |

The inoculated citrate broth media is allowed to set overnight or until the *S. diacetilactis* is growing vigorously and is then used to further inoculate another citrate broth media. The second inoculation is effected at a level of one part of inoculated citrate broth per 100 parts of fresh citrate broth. After the second transfer of *S. diacetilactis*, the inoculated citrate broth is permitted to stand until a vigorously growing culture of *S. diacetilactis* is obtained. The culture is then analyzed for gas-producing ability.

If a minimum gas-producing ability is shown by the *S. diacetilactis* citrate broth culture, a portion of the culture is then transferred to a 10 percent by weight solids skim milk growth media. The transfer is made at a level of about one part *S. diacetilactis* citrate broth culture to 100 parts sterile skim milk growth media. The inoculated sterile skim milk is then permitted to grow overnight, and the gas-producing ability of the culture is measured. As previously indicated, the gas-producing ability of the culture should be at least about 800 microliters of $CO_2$ per 10 milliliters of culture per 4 hour period at a temperature of 86° F. If the culture does not meet this test, the transfer procedure is again started with a different stock culture of *S. diacetilactis*.

It has been found that gas-producing micro-organisms cannot be relied upon to maintain their initial level of gas production. Consequently, it is considered a part of the present invention to select a suitable gas-producing micro-organism and thereafter supply the gas-producing micro-organism in a form such that the gas-producing ability is maintained at the level desired in the cheesemaking procedure. In this connection, where a culture of a micro-organism is maintained in a broth or nutrient media, the gas-producing ability of the culture declines as the culture is used to inoculate a growth nutrient media so as to provide stock cultures of the micro-organism which are subsequently used in the make procedure for the cheese. Each transfer of the stored culture of the micro-organism results in some lessening of the gas-producing ability of the micro-organism. Consequently, a method is provided by the present invention for maintaining selected cultures of the micro-organism at a substantially constant level of gas production.

After a suitable strain of *S. diacetilactis* has been provided, the *S. diacetilactis* is further treated to provide the *S. diacetilactis* is a form suitable for storage and maintaining the gas-producing ability of the culture. The treatment comprises growing an *S. diacetilactis* culture having a predetermined gas-producing ability, concentrating the cells grown, providing a suitable sterile storage media for the cells and freezing the culture thus obtained.

More particularly, a suitable *S. diacetilactis* culture which has been tested as indicated above is used to inoculate a suitable growth media, such as the following composition:

| Ingredient | Weight Percent |
| --- | --- |
| Hydrolyzed casein | 1.0 |
| Dextrose | 1.0 |
| Yeast extract | 1.0 |
| Dibasic potassium phosphate | 0.5 |

The inoculated media is then incubated at a suitable temperature until an optimum level of *S. diacetilactis* cells are produced. The yield of *S. diacetilactis* cells may be increased by neutralizing the growth media with a suitable alkaline material such as potassium hydroxide at periodic intervals. It is desirable to maintain the pH of the inoculated media at least above about 4.0, preferably above 5.0, so that acid produced during growth of the *S. diacetilactis* does not interfere with further growth.

Optimum growth at a temperature of 72° F. is usually reached after from about 9.5 hours to about 12.0 hours. After optimum growth is reached, the inoculated media is cooled to below about 60° F. to arrest decay of viable organisms. At this time the media usually has from about $10^8$ to about $10^9$ cells per milliliter. To provide the desired level of cells for inoculating batches of milk to be made into blue-veined cheese it is desirable to provide a cell concentrate having about $10^{11}$ cells per milliliter. A preferred method for preparing the cell concentrate is to pass the inoculated media through a centrifuge. In general, a desired cell concentrate is obtained when 1 liter of the inoculated media is reduced to from about 5 to about 25 grams.

The cell concentrate is then combined with a suitable storage media and frozen. One suitable storage media may be prepared by combining about 15 parts of sterile glycerol with about 100 parts of sterile skim milk. The cell concentrate is combined with about five times its weight of the sterile storage media and frozen in suitably sized lots. The concentration and freezing of the gas-producing micro-organism enables the micro-organism to be stored for future use without loss of its producing properties.

The following example further illustrates various features of the invention but is intended to in no way limit the scope of the invention which is defined in the following claims.

EXAMPLE

An *S. diacetilactis* culture is used to inoculate 150 gallons of a growth media of the above composition. The growth media is first sterilized at 121° C. for 15 minutes. Thirty-five hundred milliliters of a citrate broth culture of the *S. diacetilactis* which has been tested for gas-producing ability, as previously explained, is then added to the 150 gallons of growth media. The pH of the inoculated media gradually decreases to about 5.0 after 8 to 10 hours and is then adjusted to a pH of 7.0 with about 3.6 liters of sterile potassium hydroxide. After an additional period of about 1½ hours the pH has again decreased to a level of about 5.0 and is again neutralized to a pH of 7.0 with potassium hydroxide. The inoculated media is then cooled to 40° F. and the contents are conducted to a centrifuge. The entire contents of the inoculated media are centrifuged without stopping. A yield of about 4.0 to 4.5 pounds of a cell paste of *S. diacetilactis* is obtained.

A milk media is then prepared by heating a suspension containing 10 percent by weight of nonfat milk solids to 180° F. for 60 minutes and thereafter cooling to 40° F. Fifteen milliliters of sterile glycerol are then added to each 100 milliliters of the cool milk media. Twenty grams of the cell paste obtained by the above method are then added to each 100 milliliters of the milk-glycerol mixture to provide a cell paste suspension. The cell paste suspension thus obtained is then divided into 250 ml. lots and each lot is frozen immediately in a dry ice-alcohol bath. Each lot is then stored at a temperature of −20° F. until required for use. Forty to 45 pounds of a suspended cell paste suspension are obtained.

The cell paste suspension is suitable for direct inoculation of milk to be used in making Blue cheese. In this connection 500 milliliters of the frozen cell paste mixture are used for each 20,000 pounds of milk. When used at this level, the *S. diacetilactis* cell paste concentrate provides sufficient carbon dioxide gas during curing of the Blue cheese to provide an improved vein structure in cured Blue cheese.

The cell paste produced by the above method may also be used to prepare a bulk starter by adding 15 milliliters of the cell paste to about 225 pounds of milk. The inoculated milk is then incubated overnight at a temperature of 72° F. The bulk starter is then added to the vat of milk at the same time as the lactic starter cultures. The gas-producing ability of the cell paste is not impaired by this single transfer.

It is claimed that:

1. In a method for producing blue-veined cheese wherein a first lactic starter culture is added to milk, the milk is set to provide a coagulum, the coagulum is cut to provide curd and whey, the whey is separated from the curd, a mold power is provided in the curd, the curd is formed into cheese blocks and the cheese blocks are cured to provide a blue-veined cheese, the improvement comprising providing a second culture of a gas-producing micro-organism capable of providing at least about 800 microliters of carbon dioxide for each 10 milliliters of culture per 4 hour period at a temperature of 86° F., and adding said culture to the milk from which blue-veined cheese is to be produced, said culture being added at a level sufficient to produce a desired level of gas during curing of the cheese, so as to provide an improved vein structure and move open texture in cured blue-veined cheese.

2. The method of claim 1 wherein said gas-producing micro-organism is *Streptococcus diacetilactis*.

3. The method of claim 1 wherein said gas-producing micro-organism is concentrated, frozen and stored prior to use.

* * * * *

UNITED STATES PATENT OFFICE
CERTIFICATE OF CORRECTION

Patent No. 3,635,734           Dated January 18, 1972

Inventor(s) Wayne T. Williamson and Myro Purko

It is certified that error appears in the above-identified patent and that said Letters Patent are hereby corrected as shown below:

Column 4, line 53, Claim 1, "power" should be "powder".

Signed and sealed this 18th day of December 1973.

(SEAL)
Attest:

EDWARD M. FLETCHER, JR.        RENE D. TEGTMEYER
Attesting Officer               Acting Commissioner of Patents